April 9, 1946.  S. M. MacNEILLE  2,398,020
RANGE FINDER
Filed Oct. 29, 1943  3 Sheets-Sheet 1

STEPHEN M. MacNEILLE
INVENTOR
BY
ATT'Y & AG'T

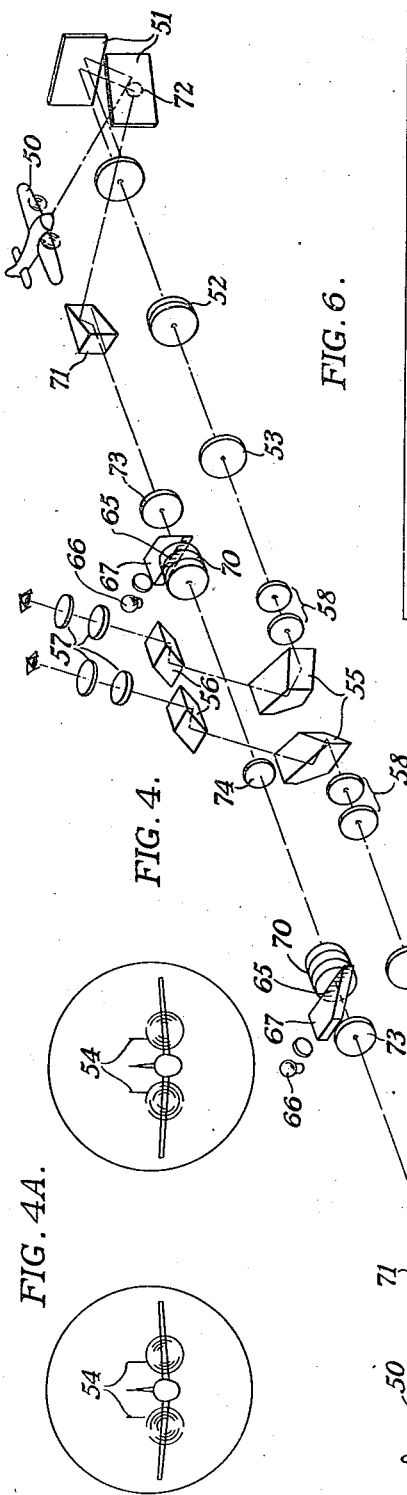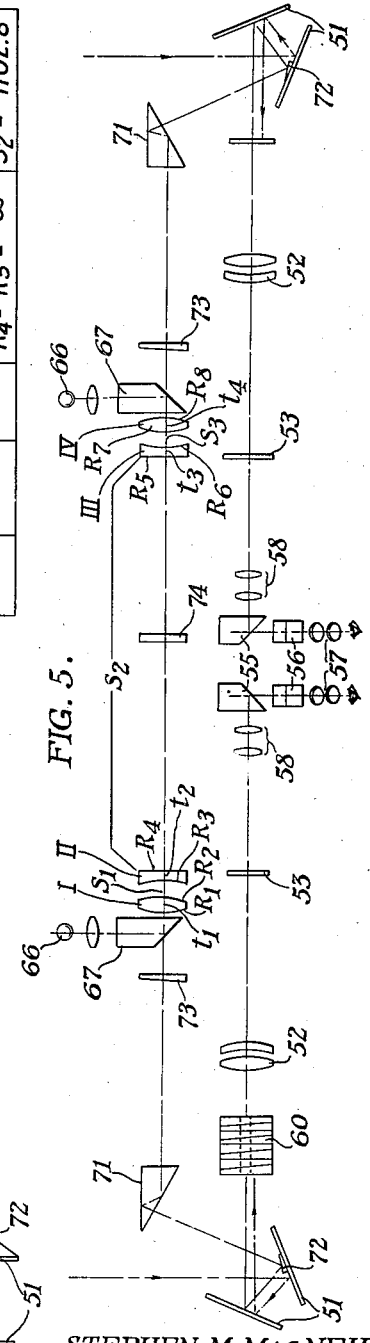

April 9, 1946.                S. M. MacNEILLE                2,398,020
                                 RANGE FINDER
                  Filed Oct. 29, 1943              3 Sheets-Sheet 3

FIG. 7.

| EF = 1136.96 mm. | | f/60 | BF = 1105.88 |
|---|---|---|---|
| LENS | $N_D$ | V | RADII | THICKNESSES |
| I & IV | 1.617 | 55.0 | $+R_1 = -R_8 = 725.91$ | $t_1 = t_4 = 4.0$ |
| " " | | | $-R_2 = +R_7 = 115.03$ | $S_1 = S_3 = 3.8$ |
| II & III | 1.5838 | 46.0 | $-R_3 = +R_6 = 106.86$ | $t_2 = t_3 = 3.0$ |
| " " | | | $R_4 = R_5 = \infty$ | $S_2 = 1105.9$ |

FIG. 8.

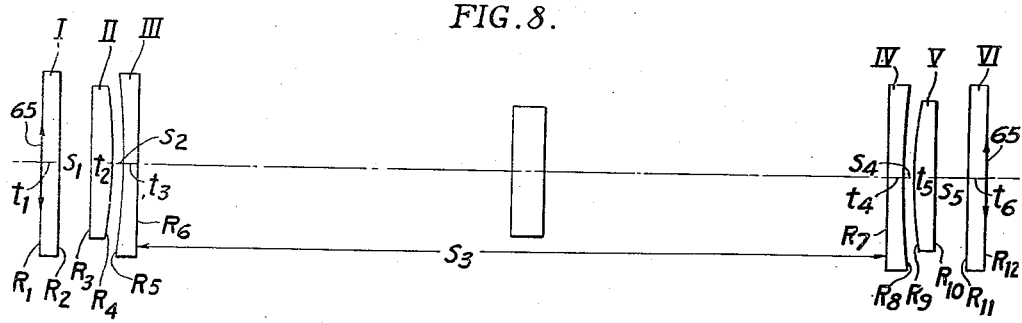

FIG. 9.

| EF = 1123.5 mm., | | f/75 | BF = 1109.7; | FF = 1131.9 |
|---|---|---|---|---|
| LENS | $N_D$ | V | RADII | THICKNESSES |
| I & VI | 1.5838 | 46.0 | $R_1 = R_{12} = \infty$ | $t_1 = t_6 = 3.5$ |
| " " | | | $R_2 = R_{11} = \infty$ | $S_1 = S_5 = 6.2$ |
| II & V | 1.617 | 55.0 | $R_3 = R_{10} = \infty$ | $t_2 = t_5 = 3.6$ |
| " " | | | $-R_4 = +R_9 = 89.61$ | $S_2 = S_4 = 1.56$ |
| III & IV | 1.5838 | 46.0 | $-R_5 = +R_8 = 96.33$ | $t_3 = t_4 = 2.7$ |
| " " | | | $R_6 = R_7 = \infty$ | $S_3 = 1096.0$ |

STEPHEN M. MacNEILLE
INVENTOR
BY
ATT'Y & AG'T

Patented Apr. 9, 1946

2,398,020

UNITED STATES PATENT OFFICE 2,398,020

RANGE FINDER

Stephen M. MacNeille, Oak Ridge, Tenn., assignor to Eastman Kodak Company, Rochester, N. Y., a corporation of New Jersey Application October 29, 1943, Serial No. 508,186

6 Claims. (Cl. 88—2.7)

This invention relates to range finders. This is Case T of a series listed, for example, in Case O, Serial No. 491,956, filed June 23, 1943, by MacNeille.

This invention relates particularly to range finders having a collimating system for maintenance of calibration for example by auto-collimation or range correction setting or stereo systems in which the reticle marks are projected by a collimating system.

It is the object of the invention to provide means for introducing the collimating beam into alignment with the target beams at at least one of the viewing points of the instrument. That is, the object of the invention is to provide means for projecting the collimating beam from one viewing point to the other outside of the main ranging beam or, in those systems in which the collimating beam originates outside of the ranging system to be introduced into the system at both viewing points, the object of the invention is to provide means for this latter introduction.

The preferable form of the invention is best described with respect to a range finder having a base line between two viewing points spaced in the ranging plane at which points incoming beams are received from the target being ranged which is also in the "ranging plane." The terms base line and ranging plane thus have obvious meanings. Various other applications of this series describe range finders having collimating systems for the maintenance of calibration with a portion of the collimating beam located between the viewing points parallel to the base line. In applying the present invention in its preferred embodiment to such a system in which the parallel portion of the collimating beam is in the ranging plane a double-reflecting prism is used at each end or at least at one end of the parallel portion of the collimating beam for directing the collimating beam to, or for receiving it from, the adjacent viewing point which in turn includes at least one reflecting surface for reflecting the target beam and a spot on the surface at an angle (referred to as angle A) to the rest of the surface for reflecting the collimating beam. So that the prism will not interfere with the incoming target beam it is located to the side thereof nearer the other viewing point, specifically so that the collimating beam and the target beam at the viewing point form an angle between 10° and 80° and equal to twice that between the reflecting spot just mentioned and the rest of the reflecting surface.

Since the light may be traveling in either direction in the collimating beam, depending on to which collimating system the present invention is applied, it is difficult to describe the orientation of this prism and the reflecting spot. The description is further complicated by the fact that the reflecting unit at each viewing point may include one or more reflecting surfaces and the reflecting spot may be on any one of these or less conveniently could be separated into a series of spots, one on each reflecting surface. However, assuming that the target beam arrives at the viewing point and is reflected by a reflecting unit of one or more reflecting surfaces away from the viewing point ultimately to reach a comparison plane of the range finder, one can describe the present invention with respect to a light ray assumed to be coming backwards along the target beam after the beam has been reflected from the unit. This ray (either immediately or after one or more reflections in the reflecting unit) strikes the reflecting spot in question and is reflected directly (or with additional reflections in the reflecting unit) to the prism. That is, this, perhaps supposititious, ray would be reflected from the unit to intersect the portion of the collimating beam which is parallel to the base line at some angle which happens to be 90°—2A and at a point to the side of the incoming target beam nearer the other viewing point. The prism is located at this point of intersection and is arranged to doubly reflect such a ray and direct it along the parallel portion of the collimating beam. Of course, the light may be going in the other direction in which case it comes in along the parallel portion, is reflected by the prism to the viewing point reflecting unit and somewhere therein strikes the reflecting spot which is aligned to send the collimating beam into alignment with the target beam.

Preferably the prism is arranged to have its entrance and exit surfaces, generically called light transmitting surfaces, approximately orthogonal to the entrant and exit directions of the collimating beam. These two surfaces are in this preferred embodiment perpendicular to the ranging plane and intersect at an apex angle pointing toward the base line which angle is equal to 90° minus 2A where A is again the angle between the reflecting spot and the rest of the reflecting surface. One of these light transmitting surfaces also acts internally to reflect the collimating beam once, but which of the two surfaces does this depends on which of two permissible orientations is taken up by the third effective and internal reflecting surface of the prism, which third surface is oriented at angles 45°—A and 45°+3A with the transmitting surfaces. That is the third surface may be at an angle 45°—A with either of the transmitting surfaces and should be on the side of the prism nearer the target if the "parallel" portion of the collimating beam is in front of the base line.

One preferred form of the invention has the reflecting spot at a 15° angle to the rest of the adjacent reflecting surface and employs a 30—60—90 prism with its hypotenuse orthogonal to the portion of the collimating beam from the viewing point or orthogonal to the "parallel" portion of the collimating beam, the short side of the prism being orthogonal to the other portion respectively in each case.

Preferably, of course, the invention is applied at both viewing points so that the double reflecting prisms are between the two incoming target beams. The "parallel" portion of the collimating beam between these two prisms may be merely reflected from one prism to the other or may include a mutual nodal focal plane reticle mark generating system of a type described for example in Case J of this series, namely Serialy No. 479,100, MacNeille and Holmes, filed March 13, 1943.

Although the present invention is most needed and hence most useful in those systems in which the "parallel" portion of the collimating beam is in the ranging plane as discussed in detail above, it is also applicable to systems in which this portion of the beam is above or below the ranging plane and may be directly applied thereto although of course the dihedral angles between various reflecting surfaces then depend on the tilt of the collimating system with respect to the ranging plane so that the above discussion of angles must be modified with the third dimension in mind. The operation of the invention will be fully understood from the following description when read in connection with the accompanying drawings in which:

Fig. 4 is a perspective view of a stereoscopic range finder incorporated in the invention, Fig. 4A being the binocular field of view.

Fig. 5 is a plan view of the arrangement shown in Fig. 4.

Fig. 6 is a table of the lenses constituting the mutual nodal focal plane reticle generating system of Figs. 4 and 5.

Fig. 7 is a table of alternative lenses similar in appearance to those shown in Fig. 5.

Figs. 8 and 9 are an optical diagram and a table relating to a third alternative form of lenses.

Figure 1:
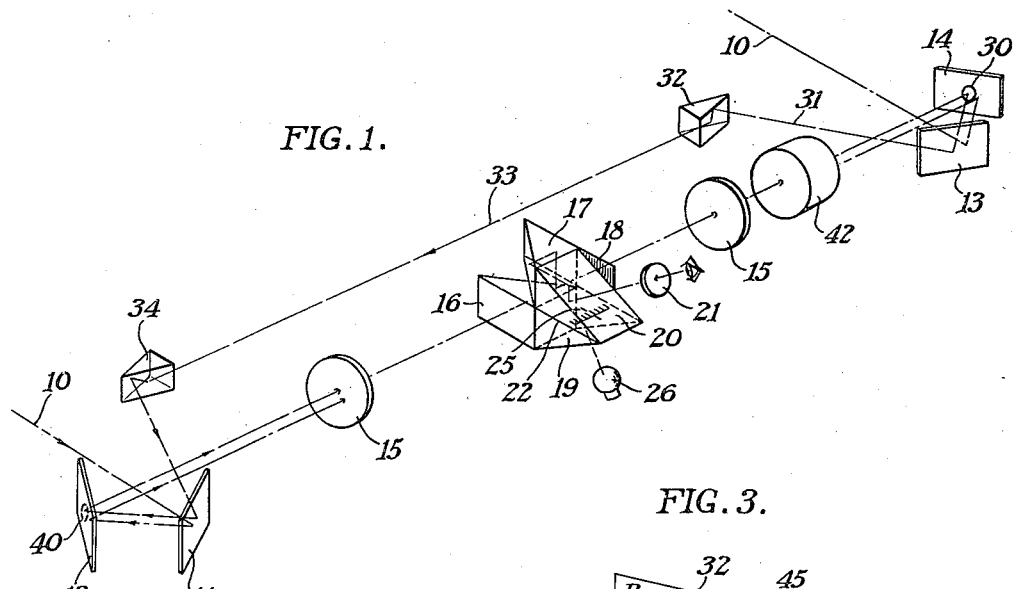
Fig. 1 is a perspective view of the optical system of a coincidence type range finder incorporating the invention.
Figure 2:
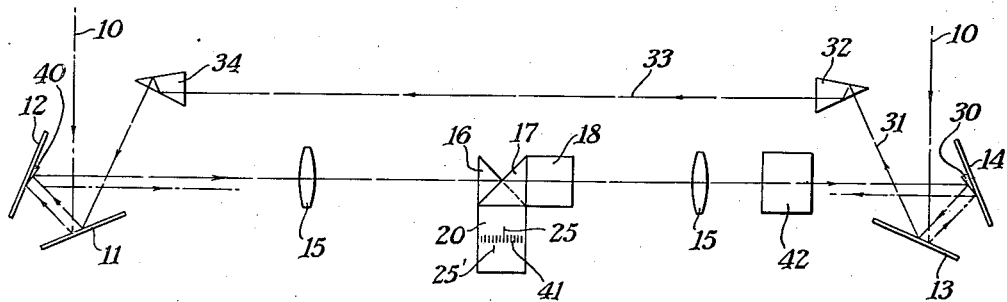
Fig. 2 is a plan view of the arrangement shown in Fig. 1.

In Figs. 1 and 2, target beams 10 are received from a target being ranged and directed by optical squares made up of reflectors 11, 12, 13 and 14, into alignment toward each other. These beams are focused by objectives 15 and through a prism unit made up of prisms 16, 17, 18, 19 and 20 come to focus to form images in a split field comparison plane which images are viewed through eyepiece 21. Specifically, the left hand target beam is reflected by the prism 16 and the prism 19 up through a transparent half of the interface 22 between the prisms 19 and 20. The right hand target beam is reflected by the rhomb 18, the prism 17 and the prism 20 down to the reflecting half of the interface 22 whence it is reflected to the eyepiece 21.

To provide auto-collimation an index in the form of a transparent line 25 is engraved on the reflecting part of the interface 22. This index 25 is transilluminated by a lamp 26 and a collimating beam therefrom is reflected by the prisms 20, 17, and 18, through the right hand objective 15 which collimates the light from the index. This collimated collimating beam, (i. e., the beam for collimating the range finder is itself collimated at this point) then strikes a spot 30 on the reflector 14 at an angle A (between 5° and 40°) to the rest of the reflecting surface 14 so that the collimating beam after further reflection by the mirror 13 travels forward in the ranging plane at an angle 2A to the incoming target beam 10. This beam 31 then strikes a double-reflecting prism 32 and is reflected parallel to the base line of the range finder along a portion 33 of the collimating beam to strike another double-reflecting prism 34 which reflects it to the left viewing point of the range finder where it is reflected by the mirror 11. After this reflection it strikes a spot 40 on the mirror 12 and is reflected into alignment with the target beam going from this viewing point to the left objective 15. The collimating beam is then brought to focus by this left objective 15 and the prisms 16 and 19 to form an image 25' adjacent to a scale 41 engraved on the transparent portion of interface 22.

In operating the instrument the two target images as seen through the eyepiece 21 are brought into coincidence by adjusting a light deviator 42 which deviates both the target beam and the collimating beam passing therethrough. The image 25' indicates the range of the target against the scale 41, both the image and the scale being seen directly in the middle of the field of view. Anything which affects the coincidence or lack of coincidence of the target images equally affects the collimating beam and this insures proper calibration once it has been established. However, auto-collimation of this type is only one form of instrument using internal collimating systems and the present invention made up of the spots 30 and 40 and the prisms 32 and 34 is equally applicable to all forms of such instruments.

Figure 3:
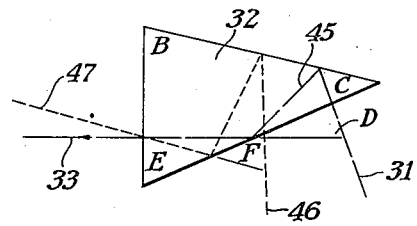
Fig. 3 is an enlarged view of one detail of Fig. 2.

It will be noted in this embodiment of the invention that the portion 33 of the collimating beam parallel to the base line of the instrument is in the ranging plane but, of course, by suitable tilting of the spots 30 and 40 it could be slightly above or below the ranging plane. Preferably it is in the position shown however. When it is in this position the entrant and exit surfaces and also the third surface of each of the prisms 32 and 34 are all perpendicular to the ranging plane. The entrant and exit surfaces are approximately orthogonal to the collimating beam as it enters and leaves these prisms. In Fig. 3 the geometry of the prisms is illustrated in some detail. It will be noted that the incoming ray 31 is eventually deviated through an angle D to form the "parallel" portion 33 of the collimating beam. To have the entrant and exit surfaces of the prism orthogonal to these rays, it is obvious that the apex angle E must equal the angle D which in turn equals 90° minus the angle between the rays 31 and 10, i. e. 90°—2A. With the surface EC thus oriented orthogonal to the ray 31, the direction of the ray 45 is specified since the rays 33 and 45 must make equal angles with the surface of reflection. Similarly the rays 45 and 31 must make equal angles with the surface BC and hence its orientation is fixed. By simple geometry the angle C equals 45°—A and the angle B equals 45°+3A. Actually the same deviation D between the incoming ray 31 and the outgoing ray 33 may be produced by an orientation in which the angles B and C are interchanged but in this case the incoming ray 31 after entering the surface EC is reflected at the surface EB and then at the surface BC before being transmitted through the surface EB. The surfaces EC and EB are referred to as "the light transmitting surfaces" and the third surface BC must form an angle 45°—A with one of these light transmitting surfaces and an angle 45°+3A with the other light transmitting surface.

Actually the orientation of the prism is not too critical since, if it were tipped very slightly so that the incoming ray entered along the line 46, it would travel as shown to emerge along the line 47 at an angle F to the incoming ray 46 which angle F is equal to the angle D at least to a first approximation even when refraction is taken into account.

In a preferred embodiment of the invention the angle A is 15° which means that the angle between the rays 10 and 31 is 30°, that the angle D equals 60°, that the angle E equals 60° and that one or other of the angles B and C equals 30°, the angle that is left being 90°. With the light path shown angle C would be the one that equals 30°. This preferred embodiment is shown in Figs. 4 and 5.

In Figs. 4, 4A and 5 light beams from the target being ranged represented by two small aeroplanes 50 are received at the two viewing points and are reflected by optical squares made up of reflectors 51 through objectives 52 into focus in image planes 53 wherein the images are viewed stereoscopically, the apparent distance of the target being compared with the apparent distance of the reticle marks 54 which are images formed in the comparison planes 53 to have an apparent mark distance. The target images and reticle images are viewed through a binocular viewing system including relay lenses 58, erecting prisms 55, rhombs 56 adjustable to take care of different interocular separations, and eyepieces 57. The apparent target distance is adjusted by means of mutually rotatable wedges 60 for laterally deviating the image in the left hand image plane. The reticle marks in both planes are projected images and to prevent this deviation of the target image being accompanied by a corresponding deviation of the reticle image, an aperture 61 is provided through the middle of the deviator 60 so that the reticle beam, which in this case constitutes the range finder collimating beam, remains unaffected. According to the invention the reticles originate as marks 65 illuminated by lamp 66 and prisms 67. These marks 65 are adjacent to identical lenses 70 separated by the focal length of either so that each lens collimates the light from the mark adjacent to the other lens and sends the collimated beam past the sides of the prisms 67 to 30—60—90 prisms 71 which according to the invention reflect the collimating beams to spots 72 on reflectors 51 and thence into alignment with the target beams. For zero adjustment of the instrument when first assembled, rotatable wedges 73 and a tiltable block 74 are included in the collimating (reticle) system.

The lenses 70 are symmetrical and each of them has the following characteristics, the separation of the marks $S_2$ being given for air, but being slightly reduced from that given when the thickness and index of refraction of the tilting plate 74 are taken into account in the usual way.

| EF=1115.88 mm. | | f/60 | BF=1102.79 mm. | |
| --- | --- | --- | --- | --- |
| Lens | $N_D$ | V | Radii | Thicknesses |
| I | 1.5110 | 63.5 | $R_1=+541.76$ $R_2=-541.76$ | $t_1=4.0$ mm. $S_1=4.0$ mm. |
| II | 1.5838 | 46.0 | $R_3=-585.0$ $R_4=\infty$ | $t_2=3.0$ mm. $S_2=1102.8$ |

An alternative arrangement of the lenses 70 similar in appearance to that shown in Fig. 5 is given in Fig. 7 and also below and has the advantage of using stronger lens elements so that it is somewhat easier to adjust the lenses when assembling the instrument to compensate for any slight variation in focal length. That is the focal length changes more rapidly as the separation of elements is changed when the individual elements are stronger.

| EF=1136.96 mm. | | f/60 | BF=1105.88 | |
| --- | --- | --- | --- | --- |
| Lens | $N_D$ | V | Radii | Thicknesses |
| I | 1.6170 | 55.0 | $R_1=+725.91$ $R_2=-115.03$ | $t_1=4.0$ $S_1=3.8$ |
| II | 1.5838 | 46.0 | $R_3=-106.86$ $R_4=\infty$ | $t_2=3.0$ $S_2=1105.9$ |

The arrangement shown in Figs. 8 and 9 and the following table has the advantage that the reticle marks 65 are located exactly in the nodal plane of the lenses to which they are adjacent and in the focal plane of the other lenses. This is to insure that any movement of either lens equally affects both reticle images as projected. For example, movement of the right hand lens carrying the right hand reticle mark with it causes the image of this right hand mark in the left hand image plane to shift slightly and, due to the movement of the lens, also causes the image of the left hand mark as seen in the right hand plane to shift similarly and by the same amount so that the apparent distance of the reticle marks 54 stereoscopically viewed by the observer remains unchanged.

| EF=1123.5 | | f/75 | BF=1109.7 | |
| --- | --- | --- | --- | --- |
| Lens | $N_D$ | V | Radii | Thicknesses |
| I | 1.5838 | 46.0 | $R_1=\infty$ $R_2=\infty$ | $t_1=3.5$ $S_1=6.2$ |
| II | 1.617 | 55.0 | $R_3=\infty$ $R_4=-89.61$ | $t_2=3.6$ $S_2=1.56$ |
| III | 1.5838 | 46.0 | $R_5=-96.33$ $R_6=\infty$ | $t_3=2.7$ $S_3=1096.0$ |

I claim:

1. A range finder having a base line between two viewing points spaced in the ranging plane, at which points incoming beams are received from the target being ranged, and a collimating system for maintenance of calibration with a portion of the collimating beam in the ranging plane parallel to the base line, characterized, at at least one viewing point, by a reflecting unit with at least one reflecting surface for reflecting the target beam received at that point and a spot on said reflecting surface at an angle A between 5° and 40° to the rest of the surface oriented so that a ray of light coming backwards along the target beam and striking the spot would be reflected from the unit to intersect said parallel portion at an angle 90°—2A and at a point to the side of an incoming target beam nearer the other viewing point, and a prism at the point of intersection for doubly reflecting such a ray, for deviating it through an angle 90—2A and for directing it along said parallel portion.

2. A range finder according to claim 1 in which said prism has two light transmitting surfaces at an angle 90°—2A to each other and approximately orthogonal to the entrant and exit directions of such a ray and a third surface at angles 45°—A and 45°+3A with the transmitting surfaces, all three surfaces being perpendicular to the ranging plane.

3. A range finder according to claim 1 in which the angle A equals 15° and the prism is a 30—60—90 prism with two light transmitting surfaces approximately orthogonal to the entrant and exit directions of such a ray.

4. A range finder according to claim 1 having similar reflecting units at both viewing points.

5. A range finder according to claim 1 in which the reflector unit consists of an optical square having two reflecting surfaces at 45° to one another and the spot is on one of these reflecting surfaces.

6. A range finder having a base line between two viewing points spaced in the ranging plane at which points incoming beams are received from the target being ranged, and a collimating system for maintenance of calibration with a portion of the collimating beam parallel to the base line characterized, at at least one viewing point, by a reflecting unit with at least one reflecting surface for reflecting the target beam received at that point and a spot on said reflecting surface at an angle between 5° and 40° to the rest of the surface oriented so that a ray of light coming backwards along the target beam and striking the spot would be reflected from the unit to intersect said parallel portion at a point to one side of the target beam and a prism at the point of intersection for doubly reflecting such a ray and for directing it along said parallel portion.

STEPHEN M. MacNEILLE.